E. O. LEECH.
GATE RETAINER.
APPLICATION FILED SEPT. 20, 1911.
1,033,600.
Patented July 23, 1912.
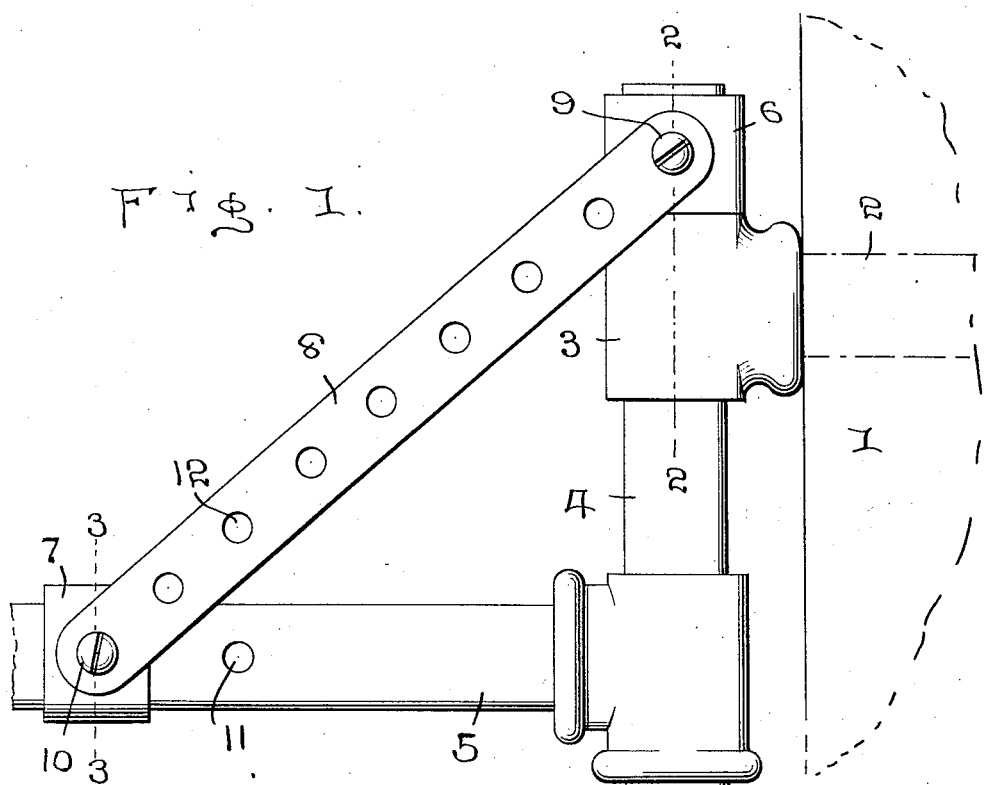
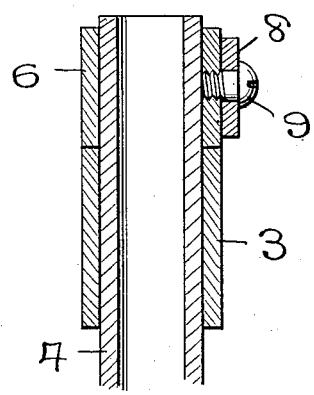
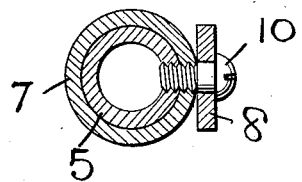
WITNESSES:
INVENTOR
E. O. Leech
BY
W. J. Fitzgerald
Attorneys

UNITED STATES PATENT OFFICE.

EDWARD O. LEECH, OF HEBRON, ILLINOIS.

GATE-RETAINER.

1,033,600. Specification of Letters Patent. Patented July 23, 1912.

Application filed September 20, 1911. Serial No. 650,338.

*To all whom it may concern:*

Be it known that I, EDWARD O. LEECH, a citizen of the United States, residing at Hebron, in the county of McHenry and State of Illinois, have invented certain new and useful Improvements in Gate-Retainers; and I do hereby declare the following to be a full, clear, and exact description of the invention, such as will enable others skilled in the art to which it appertains to make and use the same.

My invention relates to new and useful improvements in gate hinges and my object is to provide a device whereby a gate may be adjustably retained in different vertical positions.

Other objects and advantages will be hereinafter set forth and pointed out in the specification.

In the accompanying drawings, which are made a part of this application, Figure 1 is a side elevation of the upper portion of a gate, showing the hinging and adjusting means therefor. Fig. 2 is a sectional view as seen on line 2—2, Fig. 1, and Fig. 3 is a sectional view as seen on line 3—3, Fig. 1.

Referring to the drawings in which similar reference numerals designate corresponding parts throughout the several views, 1 indicates a post or other stationary object, to which is secured hinge members 2, the outer ends of said hinge members having sockets 3 to receive the end post 4 of the gate.

The post 4 extends a distance above the frame 5 of the gate and through the socket 3 so that the gate may be raised or lowered with respect to the ground over which it swings.

The adjustment of the gate is accomplished by placing a collar 6 around the end post 4 and above the socket 3, said collar being loose on the end post. A similar collar 7 is placed on the upper frame section of the gate and the two collars are connected by a strap 8, which is connected to the collars 6 and 7 through the medium of screws 9 and 10, respectively.

The upper frame section of the gate is provided with a number of threaded openings 11 into which takes the end of the screw 10, while the strap 8 is provided with a plurality of openings 12 to accommodate either of the screws.

In accomplishing an adjustment the screw 10 may be removed and the gate adjusted to the proper height, when the screw 10 is again engaged with the collar on the upper frame section and the gate thus held in its adjusted position. A further adjustment may be obtained by moving the collar 7 back and forth on the upper frame section 5 to engage with the various openings 11 in said frame section. The strap 8 not only serves to hold the gate in its adjusted position, but serves to brace the gate and hold the same against sagging at its free end.

The various parts of the gate and the end post are preferably formed of sections of gas pipe or the like, thereby producing a strong and durable structure, while the weight thereof will be maintained at a minimum.

What I claim is:

1. The combination with an anchored hinge section having a socket, of a gate, comprising a frame, an end post for the frame, said end post projecting above the frame and through said socket, a collar surrounding the end post and resting on the socket and means to adjustably connect the collar to the frame.

2. The combination with an anchored hinge member having a socket, of a gate comprising an end post, a frame engaged with said end post, said post projecting above the frame and through the socket, a collar surrounding said end post and resting on the socket, a similar collar on said frame and a strap adjustably connecting said collars.

3. The combination with an anchored hinge member having a socket, of a gate construction comprising a frame, an end post connected to and projecting above the frame and through the socket, a collar surrounding the end post and resting on the socket, a similar collar on the frame, a strap having a plurality of openings and screws adapted to be introduced through the openings to adjust the height of the gate.

In testimony whereof I have signed my name to this specification in the presence of two subscribing witnesses.

EDWARD O. LEECH.

Witnesses:
GEO. GRANZO,
R. C. WOODRICH.

Copies of this patent may be obtained for five cents each, by addressing the "Commissioner of Patents, Washington, D. C."